Jan. 13, 1931.  A. E. DRISSNER ET AL  1,788,422
INDEXING MECHANISM FOR AUTOMATIC MULTIPLE SPINDLE SCREW MACHINES
Filed Feb. 17, 1928  3 Sheets-Sheet 1

Jan. 13, 1931. A. E. DRISSNER ET AL 1,788,422
INDEXING MECHANISM FOR AUTOMATIC MULTIPLE SPINDLE SCREW MACHINES
Filed Feb. 17, 1928 3 Sheets-Sheet 3

Inventors,
Charles Q. Garey
Alfred E. Drissner
by their Attorney

Patented Jan. 13, 1931

1,788,422

UNITED STATES PATENT OFFICE

ALFRED E. DRISSNER, OF CLEVELAND, OHIO, AND CHARLES Q. GAREY, OF WINDSOR, VERMONT, ASSIGNORS TO THE NATIONAL ACME COMPANY, OF CLEVELAND, OHIO, A CORPORATION OF OHIO

INDEXING MECHANISM FOR AUTOMATIC MULTIPLE-SPINDLE SCREW MACHINES

Application filed February 17, 1928. Serial No. 254,973.

This invention relates to metal working machines, such as those commonly known as automatic screw machines, and it more particularly relates to the indexing mechanism for the work spindle carrier of an automatic multiple spindle screw machine, the object of the invention being to provide an improved indexing mechanism effective to equally distribute the strain of indexing between the front and rear bearings of the spindle carrier, with the result that a more efficient and freer indexing of the carrier is obtained and chattering or jumping of and tendency to tip the carrier avoided.

A further object of the invention is the provision of an improved indexing mechanism which will free the rear end of the carrier from all obstructions so that any type of spindle bearing may be used and which also permits the parts of the indexing mechanism to be more readily machined and assembled.

Heretofore it has been the practice in machines of this class to index the work spindle carrier or cylinder by means located at the rear thereof, and as this cylinder with its rotating work spindles is quite a heavy piece of mechanism, it follows that the strain of indexing was considerable, this strain largely coming upon one end of the cylinder and causing a tipping and binding at the opposite end because the strain was not equalized upon the bearings of the cylinder and, consequently, there was a chattering or jumping of the cylinder at times and considerable wear upon the cylinder bearings, requiring their frequent adjustment or renewal. Furthermore, when the cylinder was indexed from the end by certain forms of indexing means, only certain types of work spindle bearings could be used because the amount of metal left for boring to accommodate the spindle bearings was very much limited, whereas by indexing in the improved manner herein about to be described, the rear end of the cylinder is free from all obstructions and consequently any type of bearing for the spindles at the front or rear of the carrier may be used since there is sufficient metal left to accommodate bores suitable for either straight, tapered or anti-friction bearings.

In the drawings accompanying and forming a part of this specification:

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

Figure 1:
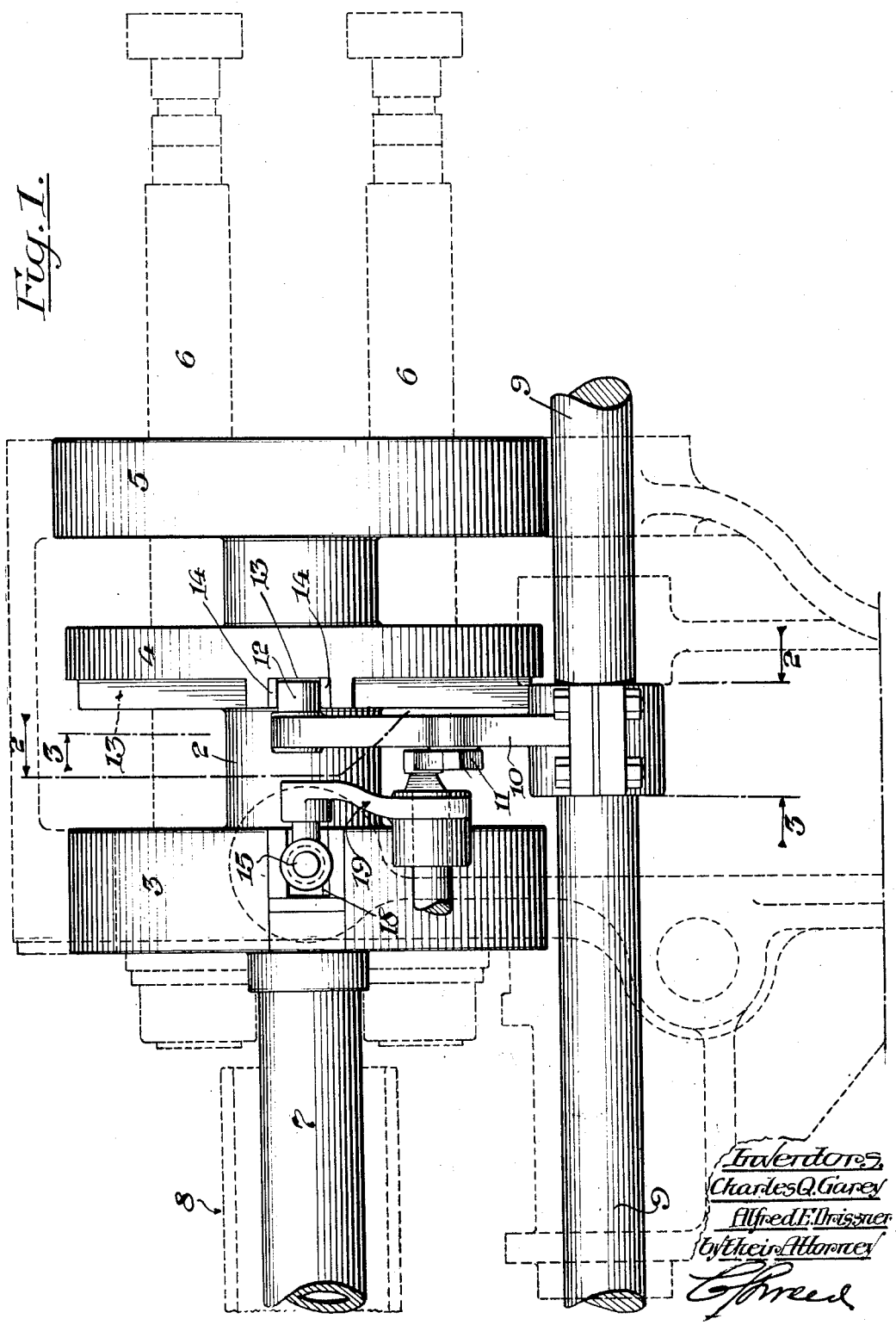
Figure 1 is a side view of so much of an automatic multiple spindle screw machine as it is deemed necessary to illustrate for the purpose of showing this improved indexing mechanism.
Figure 2:
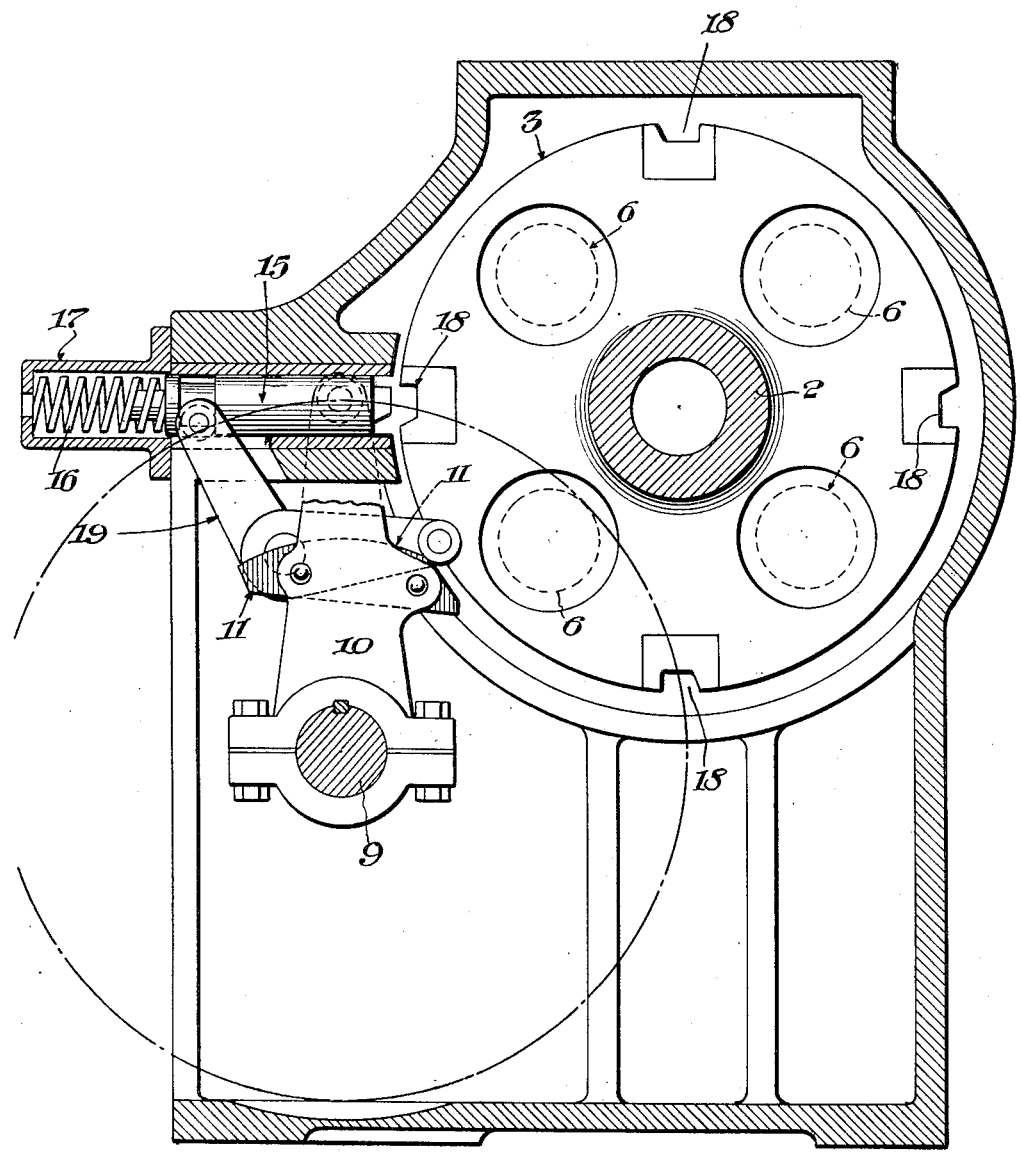
Fig. 2 is a cross-sectional view thereof taken on line 2—2, Fig. 1, illustrating the locking mechanism.
Figure 3:
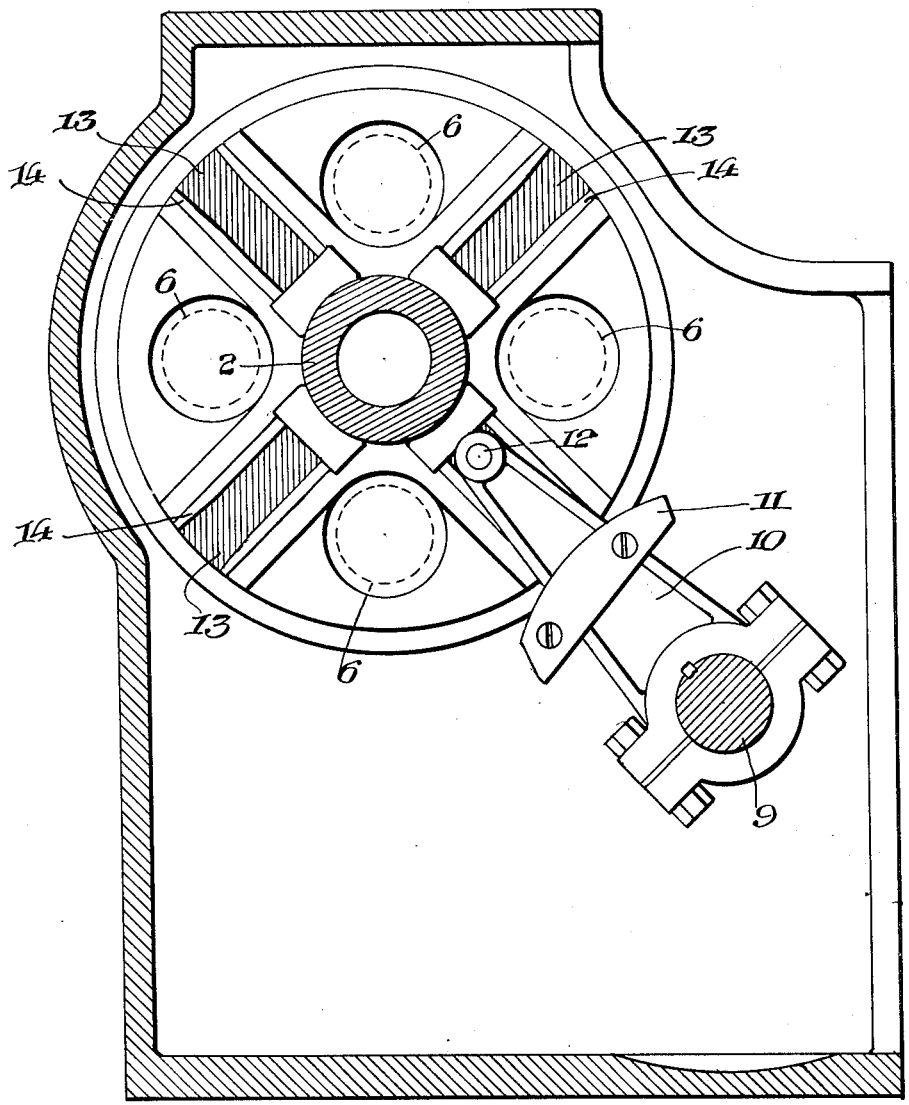
Fig. 3 is a cross-sectional view taken on line 3—3, Fig. 1, illustrating the indexing mechanism.

In the present improvement the work spindle carrier comprises a centrally-bored member or hub 2 provided with three disks, 3, 4 and 5, the disk 4 being located intermediate or substantially midway between the disks 3 and 5, which latter constitute the end disks of the carrier, which are properly supported by suitable bearings in the casing or housing for the carrier. Thus, what may be properly termed a skeleton form of work carrier is provided. In these disks are mounted the desired number of rotary work spindles 6, which, however, have their bearings only in the two end disks, passing through the center disk with sufficient clearance (see Figs. 2 and 3) so that none of the shock of these work spindles, which continuously rotate at high speed and carry and rotate the stock or work bars which are frequently up to fifteen feet (15 ft.) in length, is transmitted to the center disk or to the indexing mechanism and, consequently, the shock of indexing is not transmitted to the spindle bearings and is equalized between the work cylinder or carrier bearings. When this carrier is used with a Gridley automatic, the front end disk receives one end of a tube or shaft 7 upon which a sliding tool carrier 8 is mounted. Through this shaft 7 and the hub 2 a rotary main driving shaft (not shown) passes for driving the rotary work spindles in the usual way. Located in the bed of the machine is a cam shaft 9 rotated by suitable means provided for that purpose, and the carrier is intermittently rotated or indexed from this cam shaft. Secured to the cam shaft is a revolving arm 10 which, in the present instance, carries a cam 11 and a roll 12.

The forward face of the intermediate disk 4 is provided with a plurality of guideways or indexing slots 13 which, in the present instance, are formed by suitably machining the disk to provide these slots. In these slots are located hardened steel straps 14 which are suitably fastened in position for contact with the roll 12 of the indexing arm 10. The number of slots will, of course, correspond to the number of indexing movements that the carrier is to have. In the present instance four of these slots are shown, and the roll 12 of the arm 10 enters these slots at the proper time and at the precise moment that the locking bolt hereinafter described is withdrawn from contact with the spindle carrier and so indexes the carrier. This indexing of the carrier is usually done on fast speed and by means of this Geneva indexing mechanism a uniformly accelerated and retarded motion is imparted to the spindle carrier, which permits extremely rapid and positive indexing and by reason of the fact that the strain of indexing is equalized since the carrier is indexed midway of its length, all shocks either at starting or stopping of the indexing operation are avoided so that the carrier and its operating mechanisms are not subjected to destructive strain, and consequently chattering, jumping and tipping of the carrier are prevented. Furthermore, as the strain of indexing is equalized between the bearings of the carrier provided at the front and rear thereof within the housing or casing of the carrier friction is materially reduced, thus facilitating a freer indexing movement of the carrier.

A suitable lock bolt mechanism for locking the cylinder in its indexing position is provided, comprising a spring-actuated bolt 15 forwardly propelled by a heavy coil spring 16 carried in a suitable housing 17 into suitable seats 18 formed in the forward disk 3 of the spindle carrier. This bolt is controlled by the cam 11 carried by the indexing arm, this cam being carried into position by the indexing arm to engage the roller end of a pivoted bell crank lever 19, the opposite end of which is also provided with a roller adapted to co-operate with a collar of the lock bolt 15, whereby the lock bolt is withdrawn by means of this cam 11 just prior to the indexing movement, and is forced forward by its coil spring into the bolt seats of the cylinder. The cam 11 is so formed that it will release the lock bolt and permit it to engage the carrier at the precise moment when the indexing roller 12 of the indexing arm 10 leaves an indexing slot.

From the foregoing it will be seen that by indexing the spindle carrier substantially midway of its length, not only are the strains of indexing equalized, the jumping, tipping and chattering of the carrier prevented, but a more even wearing of the carrier bearings is obtained, while the entire rear disk is left free so that it may be suitably bored for the reception of either straight, tapered or anti-friction bearings for the work spindles and that, furthermore, the parts of the indexing mechanism are more easily machined and assembled, while the center disk can also be made of smaller diameter than the front and rear disks, which also has certain advantages.

In these metal working machines the work spindle carrier is provided with continuously-rotating work spindles which rotate at high speed, and these work spindles carry stock or work bars projecting beyond the rear ends thereof which are frequently fifteen feet (15 ft.) in length. As these bars necessarily vibrate to a certain extent, the shock on the work spindles and their bearings in the work cylinder, as well as on the work cylinder and its bearings, is considerable. When the indexing means, in the form of a Geneva movement or any other form, is located on the end disks, either outside or inside and, therefore, right where the bearings for the work spindle carrier are located, as there is also considerable shock in indexing the carrier, especially during the starting and stopping of the carrier, this shock, of course, not only has its effect upon the bearings but upon the whole machine, and has caused considerable trouble in the past. Many attempts have been made to reduce this shock, but with only partial success.

In the present improvement, by applying the Geneva indexing movement to the central disk, the shock of indexing is practically taken away from the work spindles and equalized on the cylinder bearings. By reason of the fact that the work spindles pass through the central disk with sufficient clearance to be free thereof and have their bearings only in the front and rear disks, the shock of the indexing movement is transmitted through the entire length of the central tube 7 surrounding the spindle driving shaft, upon which tube the sliding tool carrier is mounted and which tube is supported at the outer end by the bed of the machine and at the inner end by the work spindle carrier which is likewise supported on the bed of the machine. Consequently very little, if any, of the shock is transmitted to the bearings of the work spindle carrier, while the shock of the rotary work spindles carrying the long work bars is not transmitted to the indexing mechanism since this is carried by the central disk which is entirely free of the rotary work spindles. Thus a quicker and more efficient indexing is the result, with less shock and strain and less wear on the bearings. In other words, such shocks as are necessarily present and cannot be eliminated are spread or transmitted throughout the machine instead of, as heretofore, coming directly upon the bearings of the work cylinder when the cylinder is indexed or coming directly upon the indexing mechanism during the rotation of the work spindles with their long stock bars.

It is to be understood that by describing in detail herein any particular form, structure or arrangement, it is not intended to limit the invention beyond the terms of the several claims or the requirements of the prior art.

Having thus explained the nature of our said invention and described a way of constructing and using the same, although without attempting to set forth all of the forms in which it may be made, or all of the modes of its use, we claim:

1. In a machine of the class described, the combination of an indexible work spindle carrier including a centrally-located, bored hub for the passage of a spindle driving shaft, a disk carried by said hub substantially midway of the length thereof and spaced from the ends of the carrier and extending beyond the hub, and means co-operating with said disk for indexing the carrier.

2. In a machine of the class described, the combination of an indexible work spindle carrier including a centrally-located, bored hub for the passage of a spindle driving shaft, a disk carried by said hub substantially midway of the length thereof and spaced from the ends of the carrier and extending beyond the hub, and means co-operating with a side face of said disk between its periphery and axis for indexing the carrier.

3. In a machine of the class described, the combination of an indexible work spindle carrier comprising a centrally-located, bored hub for the passage of a spindle driving shaft, a plurality of substantially equally-spaced disks carried by said hub and extending laterally beyond the hub, and means co-operating with the disk located midway of the carrier for indexing the carrier.

4. In a machine of the class described, the combination of an indexible work spindle carrier comprising a centrally-located, bored hub for the passage of a spindle driving shaft, a front and a rear disk and a spaced intermediate disk carried by said hub and extending laterally beyond the hub, and means co-operating with the intermediate disk for indexing the carrier.

5. In a machine of the class described, the combination of an indexible work spindle carrier comprising a front and a rear disk and a spaced intermediate disk, and means co-operating with the intermediate disk for indexing the carrier, said means comprising a rotary cam shaft, an arm secured thereto and located adjacent to said intermediate disk and having means co-operating with said intermediate disk.

6. In a machine of the class described, the combination of an indexible work spindle carrier comprising a bored hub having a plurality of disks, one located at each end thereof and one intermediate of and spaced from said end disks, and means cooperating with the intermediate disk for indexing the carrier and comprising a plurality of guideways carried on the face of said intermediate disk, a cam shaft, an arm mounted thereon and having means co-operating with said guideways for indexing the carrier.

7. In a machine of the class described, the combination of an indexible work spindle carrier including a centrally-located, bored hub for the passage of a spindle driving shaft, a disk carried by said hub substantially midway of the length thereof and spaced from the ends of the carrier and extending beyond the hub, means co-operating with said disk for indexing the carrier, and means for locking the carrier in its indexed position.

8. In a machine of the class described, the combination of an indexible work spindle carrier including a centrally-located, bored hub for the passage of a spindle driving shaft, a disk carried by said hub substantially midway of the length thereof and spaced from the ends of the carrier and extending beyond the hub, means co-operating with said disk for indexing the carrier, and means controlled by the indexing mechanism for locking the carrier in its indexed position.

9. In a machine of the class described, the combination of an indexible work spindle carrier comprising a centrally-located, bored hub for the passage of a spindle driving shaft, a plurality of substantially equally-spaced disks carried by said hub and extending laterally beyond the hub, means co-operating with the disk located midway of the carrier for indexing the carrier, and means for locking said carrier in its indexed position.

10. In a machine of the class described, the combination of an indexible work spindle carrier comprising a centrally-located, bored hub for the passage of a spindle driving shaft, a plurality of substantially equally-spaced disks carried by said hub and extending laterally beyond the hub, means co-operating with the disk located midway of the carrier for indexing the carrier, and means controlled by the indexing mechanism for locking the carrier in its indexed position.

11. In a machine of the class described, the combination of an indexible work spindle carrier comprising a skeleton form of carrier made up of a bored hub and three disks spaced apart, a cam shaft, an arm carried thereby and having means co-operating with the intermediate disk for indexing the carrier, and locking mechanism also controlled by the cam shaft for locking the carrier in its indexed position.

12. In a machine of the class described, the combination of an indexible work spindle carrier comprising a skeleton form of carrier made up of a bored hub and three disks spaced apart, a cam shaft, an arm carried thereby and having means co-operating with the intermediate disk for indexing the carrier, and locking mechanism also controlled by the cam shaft for locking the carrier in its indexed position, said locking mechanism comprising a bolt and means carried by said arm for operating said bolt.

13. In a machine of the class described, the combination of an indexible work spindle carrier comprising a skeleton form of carrier made up of a bored hub and three disks spaced apart, a cam shaft, an arm carried thereby and having means co-operating with the intermediate disk for indexing the carrier, locking mechanism also controlled by the cam shaft for locking the carrier in its indexed position, and comprising a spring-actuated bolt, a bell crank lever co-operating with said bolt, and a cam carried by said indexing arm for operating said bell crank lever.

14. In an indexing mechanism for rotary work spindle carriers, the combination of a carrier having a spaced disk substantially midway of its ends and means including a transversely-extending arm located substantially midway of the carrier and co-operating with said disk for indexing the carrier.

15. In an indexing mechanism for rotary work spindle carriers, the combination of a carrier having a spaced disk substantially midway of its ends, means including a transversely-extending arm located substantially midway of the carrier and co-operating with said disk for indexing the carrier, and means co-operating with the carrier for locking it in its indexed position and actuated by said indexing means and including controlling means carried by said arm.

16. In a multiple spindle screw machine having a tubular sleeve for the passage of a spindle driving shaft and a horizontally-supported, sliding tool carrier on said sleeve, the combination of a horizontally-supported, indexible work spindle carrier comprising a pair of end disks and an intermediate spaced disk, one of said end disks located adjacent to the inner end of the tubular sleeve, a cam shaft, and means operated thereby and located substantially midway of the carrier and co-operating with the intermediate spaced disk for indexing said carrier.

17. In a machine of the class described, the combination of an indexible work spindle carrier having a centrally-located disk and a pair of end disks, a rotatable work spindle supported for rotation by the end disks and free of the intermediate disk, and means co-operating with the centrally-located disk of the carrier for indexing said carrier.

18. In a multiple spindle screw machine having a sliding tool carrier, the combination of an indexible work spindle carrier comprising a pair of end disks and an intermediate spaced disk, a cam shaft, and means carried thereby and co-operating with the intermediate spaced disk for indexing the carrier, said indexing means comprising an arm secured to the cam shaft and provided with a roller at its end and a plurality of guideways carried by the intermediate disk for the reception of said roller.

19. In a multiple spindle screw machine having a sliding tool carrier, the combination of an indexible work spindle carrier comprising a pair of end disks and an intermediate spaced disk, a cam shaft, means carried thereby and co-operating with the intermediate spaced disk for indexing the carrier, said indexing means comprising an arm secured to the cam shaft and provided with a roller at its end and a plurality of guideways carried by the intermediate disk for the reception of said roller, means for locking the carrier in its indexed position and comprising a locking bolt and means carried by a part of the indexing means for shifting said bolt.

20. In a multiple spindle screw machine having a sliding tool carrier, the combination of an indexible work spindle carrier comprising a pair of end disks and an intermediate spaced disk hub-connected, said intermediate disk having a plurality of guideways on its inner face, a cam shaft, an arm secured thereto for rotation therewith and provided with a roller successively co-operating with the guideways of the intermediate disk, a spring-actuated locking bolt co-operating with one of the disks for locking the carrier in its indexed position, a cam carried by said indexing arm, and means operated thereby for shifting said bolt against the action of its spring thereby to release the carrier and permit the indexing thereof.

21. In a machine of the class described, the combination of an indexible work spindle carrier and a Geneva indexing means co-operating with a face of the carrier located substantially midway of the length thereof and between the periphery and the axis of the carrier.

22. In a machine of the class described, the combination of an indexible work spindle carrier having a centrally-located disk and means co-operating with a side face of said disk between the pheriphery and the axis thereof for indexing the carrier.

23. In a machine of the class described, the combination of an indexible work spindle carrier comprising a plurality of substantially equally-spaced disks, including a substantially centrally-located disk, and means co-operating with the side face of said centrally-located disk and between the pheriphery and the axis thereof for indexing the carrier.

24. In a machine of the class described, the combination of an indexible work spindle carrier having a centrally-located disk and a pair of end disks, rotatable work spindles supported for rotation by the end disks and passing through the centrally-located disk with sufficient clearance so as to be free thereof, and means co-operating with the centrally-located disk of the carrier for indexing the carrier.

25. In a machine of the class described, the combination of an indexible work spindle carrier having a centrally-located disk and a pair of end disks, rotatable work spindles supported for rotation by the end disks and passing through the centrally-located disk with sufficient clearance so as to be free thereof, and means co-operating with a side face of said centrally-located disk between the pheriphery and the axis thereof for indexing the carrier.

Signed at Windsor, Vermont, this 7th day of February, 1928.

ALFRED E. DRISSNER.
CHARLES Q. GAREY.